(12) United States Patent
Crum

(10) Patent No.: US 11,284,571 B2
(45) Date of Patent: Mar. 29, 2022

(54) PEST CONTROL PLANT CONTAINER

(71) Applicant: Richard Crum, Trinidad, CA (US)

(72) Inventor: Richard Crum, Trinidad, CA (US)

( * ) Notice: Subject to any disclaimer, the term of this patent is extended or adjusted under 35 U.S.C. 154(b) by 68 days.

(21) Appl. No.: 16/574,734

(22) Filed: Sep. 18, 2019

(65) Prior Publication Data

US 2021/0076577 A1 Mar. 18, 2021

(51) Int. Cl.
*A01G 13/10* (2006.01)
*A01G 13/02* (2006.01)
*A01G 9/029* (2018.01)
*A01G 13/00* (2006.01)

(52) U.S. Cl.
CPC .......... *A01G 13/10* (2013.01); *A01G 9/0291* (2018.02); *A01G 13/0237* (2013.01); *A01G 13/0281* (2013.01); *A01G 2013/006* (2013.01)

(58) Field of Classification Search
CPC ................ A01G 13/10; A01G 13/0237; A01G 2013/006; A01G 9/0291; A01G 13/0281; A01G 23/04; A01G 13/00
USPC ....................................................... 47/31, 76
See application file for complete search history.

(56) References Cited

U.S. PATENT DOCUMENTS

| | | | | |
|---|---|---|---|---|
| 555,901 A * | 3/1896 | Goodwin | ........... | A01G 13/0243 47/32.4 |
| 1,875,533 A * | 9/1932 | Weaver | ........... | A01G 13/10 47/32.4 |
| 3,305,969 A * | 2/1967 | Mattson | ........... | A01G 13/0281 47/32 |
| 4,646,470 A * | 3/1987 | Maggio | ........... | A01G 23/04 383/75 |
| 5,048,228 A * | 9/1991 | Neveu | ........... | A01G 9/1438 47/9 |
| 6,154,991 A * | 12/2000 | Duncan | ........... | D05C 1/04 38/102.2 |
| 2002/0139062 A1 * | 10/2002 | Roberts | ........... | A01G 13/105 52/101 |
| 2015/0257343 A1 * | 9/2015 | De Lima | ........... | A01G 13/0281 47/31.1 |
| 2019/0387693 A1 * | 12/2019 | Hakanson | ........... | A01G 13/043 |

* cited by examiner

*Primary Examiner* — Peter M Poon
*Assistant Examiner* — Carly W. Lynch
(74) *Attorney, Agent, or Firm* — David B. Waller

(57) ABSTRACT

The present invention is a flexible container to house a root ball of a plant and method of using the same. The container comprises a fabric sack, a securing ring and draw string. The fabric sack has an enclosed base and an open top that is folded over forming a narrow tubular aperture. The sack is made of a fabric having a mesh that inhibits or interferes with the life cycle of pests that infect or attempt to infect the root ball of the plant. The securing ring has a central aperture able to receive the stalk of the plant, an outer edge having a groove, an inner edge and an opening extending from the outer edge to the inner edge. The draw string is fitted through the narrow tubular aperture of the sack to enable the sack to be closed about the securing ring's outer edge groove.

18 Claims, 2 Drawing Sheets

PEST CONTROL PLANT CONTAINER

TECHNICAL FIELD

The present invention relates generally to devices used to reduce, remove, or illuminate pests that infest or have a developmental life cycle in the soil around the root balls of plants. More specifically, a device that surrounds the root ball of a plant and prevents pests from entering or exiting the root ball thereby interfering with their developmental life cycle.

BACKGROUND OF THE INVENTION

In agriculture, pests are managed by cultural, chemical and biological means. Ploughing and cultivation of the soil before sowing reduces the pest burden and utilizing pesticides can control the remaining pests. This process involves monitoring the crop, only applying insecticides when necessary, and by growing varieties and crops that are resistant to pests. Where possible, biological means are used, encouraging the natural enemies of the pests and introducing suitable predators or parasites. However, many of these approaches to managing pests have their disadvantages.

Chemical pesticides were first used around 2500 BC when the Sumarians used sulfur containing compounds as insecticides on their crops. Modern pest control was stimulated by the infestation of the Colorado potato beetle across the United States in the mid to late 1800's. After much discussion regarding the potential poisoning of humans from its use, arsenical compounds were applied to control the beetle. Luckily, the predicted adverse effect on humans was not observed. This led the way to a widespread acceptance of insecticides across the continent. With the industrialization and mechanization of agriculture in the 18th and 19th centuries, and the introduction of the insecticides pyrethrum and derris, chemical pest control became widespread. In the 20th century, the discovery of several synthetic insecticides, such as dichlorodiphenyltrichlorothane ("DDT"), and herbicides boosted this development. While pesticides are formulated to kill pests, many have detrimental effects on non-target species; such as for example honey-bees, solitary bees and other pollinating insects. Because of this, the widely used neonicotinoids have been banned on flowering crops in a few countries. In addition, some pesticides have been found to cause cancer and other health problems in humans. There can be acute effects immediately after exposure or chronic effects after continuous low level, or occasional exposure. Further, when utilized consistently on particular pest species they can become resistant to the insecticide as did the Colorado potato beetle, which became resistant to DDT in 1952.

Biological pest control is a method of controlling pests using other organisms. It relies on predation, parasitism, herbivory or other natural mechanisms, but typically involves an active human management role. Classical biological control involves the introduction of natural enemies of the pest that are bred in the laboratory and released into the environment. An alternative approach is to augment the natural enemies that occur in a particular area by releasing more, either in small, repeated batches, or in a single large-scale release. Ideally, the released organism will breed and survive, and provide long-term control. Unfortunately, most pests are invasive species and introducing their natural predators introduces another non-native species to the environment. This can have adverse effect when they out compete native species and those species begin to decline. In addition, the cost to develop or acquire these predatory species and the active management role they require may be economically unfeasible.

Physical pest control involves trapping or killing pests. On a domestic scale, sticky flypapers are used to trap flies. In larger buildings, insects may be trapped using such means as pheromones, synthetic volatile chemicals or ultraviolet light to attract the insects where they become trapped in a disposable housing containing a sticky base or are killed when they come in contact with an electrically charged grid. Unfortunately, these types of traps are non-discriminatory and can capture beneficial insects as well as undesirable ones.

A trap crop is a plant crop that attracts pests, diverting them from nearby high value crops. Pests that aggregate on the trap crop can then be easily managed using pesticides or other methods without affecting the high value crop. However, trap-cropping, on its own, has often failed to cost effectively reduce pest densities on large commercial scales, without the use of pesticides, possibly due to the pests' ability to disperse back into the main field.

Sterilization is another method used to control pests. This involves the mass rearing of a pest, sterilizing it by means of X-rays or some other means, and releasing it into a wild population. It is particularly useful where a female only mates once and where the insect does not disperse widely. However, this method can be costly.

Consequently, there is a need in the industry for a device that can be employed on high value crops that does not utilize potentially hazardous chemical compounds, does not introduce non-native species into the environment, is discriminate when eradicating the undesired pest, does not allow the pest to re-infest the crop and is economically feasible for growers.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The present invention is a flexible container to house a root ball of a plant. The container comprises a fabric sack, a securing ring and a draw string. The fabric sack has an enclosed base, a height, a circumference and an open top that is folded over forming a narrow tubular aperture. The sack is made of a fabric having a mesh that inhibits or interferes with the life cycle of pests that infect or attempt to infect the root ball of the plant. The securing ring has a central aperture able to receive the stalk of the plant, an outer edge having a groove, an inner edge and an opening extending from the outer edge to the inner edge. The draw string is fitted through the narrow tubular aperture of the sack to enable the sack to be closed about the securing ring. When drawn, the draw string fits into the groove of the outer edge of the securing ring.

In one embodiment of the present invention, the mesh of the fabric sac is in the range of about 70 μm to about 110 μm. The mesh may be about 70 μm, 75 μm, 80 μm, 85 μm, about 90 μm, about 95 μm, or about 100 μm. This sized mesh inhibits the growth cycle of pests present in the root ball of the plant by for example, inhibiting the pest from either entering or leaving the dirt in the root ball of the plant encased in the fabric sack. These pests include Thrips, Root Aphids, Fungus Gnats, Cucumber Beetles or Russet Mites. The dimensions of the flexible containers of the present invention include about 8 cm in length and about 8 cm in width, the circumference of about 32 cm and a height of about 16 cm; about 14 cm in length and about 14 cm in width, the circumference of about 56 cm and a height of about 36 cm; and about 28 cm in length and about 28 cm in width, the circumference of about 110 cm and a height of about 48 cm.

The securing ring diameter ranges from about 1.0 inch to about 3.0 inches. The ring may have a diameter of about 1.3 inches, about 1.5 inches, about 1.8 inches, about 2.0 inches, 2.3 inches, 2.50 inches or about 2.8 inches. The inner edge of the securing ring may further comprise adhesive and the device may further comprise a securing lock on the draw string to secure the draw string when drawn.

Another aspect of the present invention is a method of reducing, interfering or inhibiting the life cycle of a pest that resides in or attempts to enter the root ball of a plant. The method comprises the steps of applying a flexible container to the root ball of the plant and maintaining the sack on the root ball of the plant for at least one life cycle of the pest. The flexible container comprises a fabric sack having a mesh that inhibits or interferes with the life cycle of pests that infect or attempt to infect the root ball of the plant. The sack has an enclosed base, a height, a circumference and an open top that is folded over forming a narrow tubular aperture; a securing ring has a central aperture able to receive the stalk of the plant, an outer edge having a groove, an inner edge and an opening extending from the outer edge to the inner edge; and a draw string fitted through the narrow tubular aperture and, when drawn the draw string, fits into the groove of the outer edge of the securing ring.

In one embodiment of this aspect of the invention, the mesh of the flexible container is in the range of about 70 μm to about 110 μm. The mesh may be about 70 μm, about 75 μm, about 80 μm, about 85 μm, about 90 μm, about 95 μm or about 100 μm. The flexible container may have the dimensions of about 8 cm in length and about 8 cm in width, the circumference of about 32 cm and a height of about 16 cm; about 14 cm in length and about 14 cm in width, the circumference of about 56 cm and a height of about 36 cm; or about 28 cm in length and about 28 cm in width, the circumference of about 110 cm and a height of about 48 cm.

The securing ring diameter ranges from about 1.0 inch to about 3.0 inches. The ring may have a diameter of about 1.3 inches, about 1.5 inches, about 1.8 inches, about 2.0 inches, 2.3 inches, 2.50 inches or about 2.8 inches. The inner edge of the securing ring may further comprise adhesive and the device may further comprise a securing lock on the draw string to secure the draw string when drawn.

DETAILED DESCRIPTION OF THE INVENTION

Figure 1:
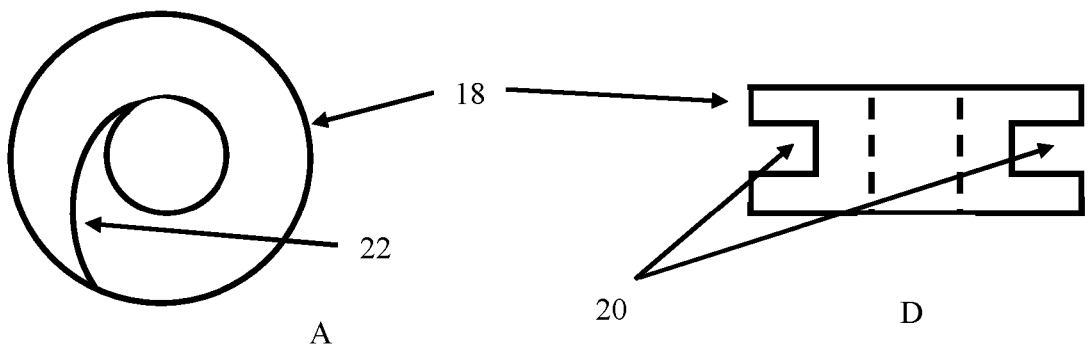
FIG. 1 (A) is a diagrammatic representation of one configuration of a small diameter securing ring with a large aperture and a curved tangential opening, top view; (B) is a diagrammatic representation of an intermediate size diameter securing ring with an intermediate sized aperture and a straight tangential opening, top view; (C) is a diagrammatic representation of a large diameter securing ring with a small aperture and a perpendicular opening, top view; (D) is a cross-sectional view of the securing ring in (A) having a square shaped groove; (E) is a cross-sectional view of the securing ring in (B) having a sideways U-shaped groove; and (F) is a cross-sectional view of the securing ring in (C) having a C-shaped groove.
Figure 1:
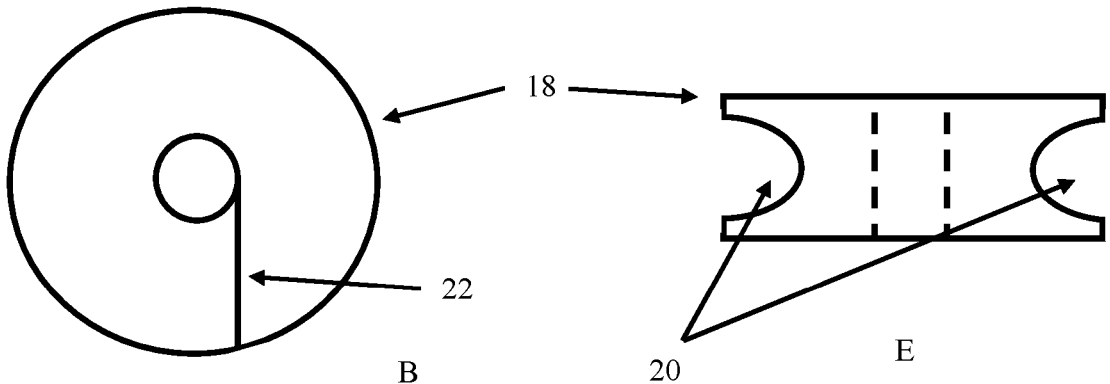
Figure 1:
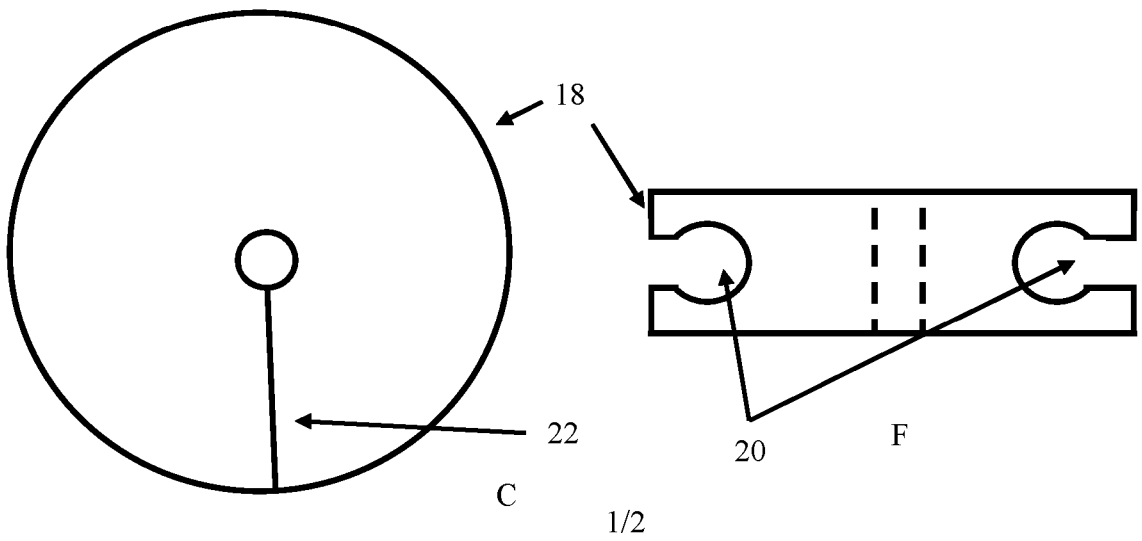
Figure 2:
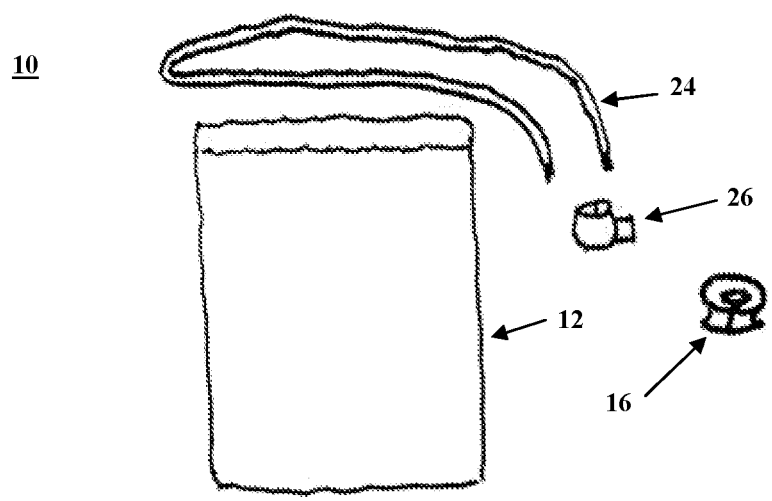
FIG. 2 is an exploded view of one embodiment of the present invention.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail.

The term "adhesive" as used herein refers to any semi-rigid easily deformable compound or chemical formulation that secures one element of the invention to another element or, in the case of the present invention, maintains the securing ring to the stalk or trunk of a plant, filling the gaps between the stalk or trunk and the securing ring preventing any pests from entering or exiting the flexible container of the present invention and does not damage the plant. For example, plant-based waxes, paraffin, or bees wax may be used for this purpose.

The term "flexible" as used herein refers to the ability of the container of the present invention to be able to easily form about the root ball of a plant. For example, the sack that forms the body of the container may be made of a material such as fabric which is flexible and can be placed about the root ball of a plant. The fabric may be made of a variety of synthetic or natural materials that have the desired mesh size and that do not degrade during the desired time of use.

The term "groove" as used herein refers to the indentation provided along the outer perimeter edge of the securing means that receives the draw string threaded through the narrow tubular aperture formed in the top edge of the fabric sack. The shape of this indentation may be provided in a variety of configurations that one skilled in the art may use to maintain the draw string when drawn. For example, a cross-sectional view of the groove may show a "U" shaped groove with 90 degree corners, rounded corners, or a circular base. It may also provide a cross-sectional view having a "C" shape wherein the upper edge extends slightly downward and the lower end extends slightly upward essentially gripping the draw string slightly when drawn.

The term "life cycle" as used herein refers to the process by which an egg laid by a particular pest hatches and matures to an adult form of the pest. In one embodiment the pest is an insect and in many cases, this cycle includes a stage where the insect resides in the soil as well as a stage in which it resides above ground. Preventing the ability of the insect to transition from a soil stage to an above soil stage or vice versa can interfere with this cycle often resulting in the death of the insect or pest.

The term "mesh" as used herein refers to the openings between the threads of a fabric. More specifically, the aperture size formed by the weave of a particular fabric. Providing a fabric having a mesh size that is smaller than the larval or adult stage of an insect can prevent that insect from leaving or entering the root ball of a plant protected by the flexible container of the present invention.

The term "pest" or "pests" as used herein includes a variety of species of the animal kingdom that are presently, or could be considered in the future, undesirable to humans. This includes any insect that could be considered undesirable to a particular horticultural or agricultural crop or plant. For example, such insect pests can include Thrips, Root Aphids, Fungus Gnats, Cucumber Beetles or Russet Mites.

The term "securing lock" as used herein refers to a device for locking the drawstring in position after the desired tension has been applied by synching the top end of the fabric sack into the groove of the securing ring. This can be a simple spring clip that, by its construction, applies pressure on both ends of the drawstring preventing the drawstring from loosening once drawn to the desired tightness about the groove of the securing ring.

The term "securing ring" as used herein refers to a means for securing the top of the fabric sack about the stem or trunk of the plant and forming a seal that prevents pests from entering or exiting the root ball of the plant. The securing means has an aperture through which the stalk or truck of the plat extends as well as a perimeter edge able to receive the draw string threaded through the narrow tubular aperture of the top of the fabric sack. Any gaps between the stalk or trunk of the plant and the aperture of the securing ring are filled with an adhesive to prevent pests from entering or exiting the flexible container.

The present invention is a flexible container to house a root ball of a plant. The container comprises a fabric sack, a securing ring and a draw string. The fabric sack has an enclosed base, a height, a circumference and an open top that is folded over forming a narrow tubular aperture. The sack is made of a fabric having a mesh that inhibits or interferes with the life cycle of pests that infect or attempt to infect the root ball of the plant by preventing them from entering or exiting the sack. The securing ring has a central aperture able to receive the stalk of the plant, an outer edge having a groove, an inner edge and an opening extending from the outer edge to the inner edge. The draw string is fitted through the narrow tubular aperture of the sack to enable the sack to be closed about the securing ring. When drawn, the draw string fits into the groove of the outer edge of the securing ring.

Fabric Sack

The fabric sack 12 of the present invention 10 may be made of a variety of materials, natural (e.g., cotton or linen) or synthetic (e.g., nylon, polyester or polypropylene) having a weave or mesh of a specified diameter that prevents a specific or a variety of types of pests from entering or exiting the sack when affixed to the root ball of the plant. The mesh may range in the size of about 70 µm to about 125 µm. More specifically, the mesh size may be 70 µm, 75 µm, 80 µm, 85 µm, 90 µm, 95 µm, 100 µm, 105 µm, 110 µm, 115 µm, 120 µm, or 125 µm. In one embodiment the mesh is 105 µm and a microfilament diameter of 80 µm also known as 55T-80 monofilament screen mesh (having a 105 µm mesh aperture size). Others include 68-55PW(S) (175 Mesh), woven 1:1, 85 µm aperture, 160-71 mesh (160-HD), woven 1:1, 88 µm aperture, and 180-54 mesh (180-T) woven 1:1, 87 µm aperture. The fabric sack material may be purchased through a variety of commercial sellers such Beijing PFM Screen Trading Co., Ltd., Langfang City, Anping, County, China. Hebei MaiShi MFG, Shijiazhuang City, Hebei, China or Hangzhou Philis Filter Technology, Co., Ltd. Zhejiang, China.

The open top end of the fabric sack 12 is folded over and secured to form a narrow tubular aperture 14 that accepts a drawstring 24 of a desired diameter. Where a small diameter drawstring 24 is used, such as with a plant having a small root ball, the tubular aperture 14 may be slightly larger than the diameter of the drawstring 24 to about 3 times the diameter of the drawstring 24. For larger plants, the drawstring 24 diameter may be larger and the tubular aperture 14 may be sized appropriately to accept the larger sized diameter drawstring 24 and to allow for ease of threading the drawstring 24 through the tubular aperture 14. The folded over material of the fabric sack 12 may be secured by a variety of methods known in the art such as by stitching or adhesive. If methods are used that could potentially create apertures that would allow pests to either enter or escape the fabric sack, these enlarged apertures may be sealed using an adhesive.

In one application, the flexible container of the present invention 10 prevents insect pests such as Thrips, Root Aphids and Fungus Gnats as well as cucumber beetles and russet mites overwintering in the soil from completing their life cycles when they hatch. In this regard, a mesh greater than 125 µm will not prevent small mites, larvae and eggs from entering or escaping the fabric sack. Correspondingly, a mesh under 80 µm may make watering and saturating the soil within the fabric sack 12 more difficult but not impossible.

A variety of sizes may be prepared based on the size of the plant root ball. For 3.5" square dura-pots or comparable containers, a fabric sack 12 having the dimensions 32 cm long×16 cm high with an 8 cm square base. For one gallon containers, the fabric sack 12 may have the dimensions 56 cm long×36 cm high with a 14 cm square base. For seven gallon containers the fabric sack 12 may have the dimensions 110 cm long×48 cm high with a 28 cm square base. The fabric sacks 12 are made of a material that is reusable and resilient to continued use. It does not have to be removed and may continue in use for 90-120 days or more. It is a defensive containment of existing infections and a barrier against new ones. In these configurations, the desired material is drawn from the stock roll and sewn into sacks with the desired dimensions and the open top edge is folded over and sewn the side of the sack forming a narrow tubular aperture 14 that will house the drawstring 24. The sewing is performed in such a way that to reduce the chance of creating apertures that would allow entering or exiting the fabric sack 12.

Specific colors may be utilized so that tears or damage to the mesh can be easily detected or to expose particular pest making them more visible to the naked eye.

In addition, chemical compounds or agents that perform a variety of functions may be adhered or chemically bound to the material of the sack 12. For example, these compounds could be insecticides, chelating agents or plant growth enhancing agents. In one embodiment, ethylenediamine tetraacetic acid ("EDTA"), a chelating agent, may be chemically bonded to the material used in making the sack 12. The EDTA acts to chelate undesirable heavy metals from the soil (South African Journal of Botany 72(3):391-397) promoting healthier growth of the plant as well as acting as a biopesticide for certain pests such as slugs and snails.

Securing Ring

The securing ring is a flexible donut shaped disc having a outer perimeter edge 18 with a groove 20 to receive the drawstring 24. It may be prepared from a variety of flexible materials that maintain some rigidity when compressed by a drawstring 24 allowing the string to make a tight seal about the outer perimeter edge 18 and within the groove 20. For example, the flexible securing ring 16 may be made of a silicone rubber (hardness range: Shore OO scale, about 35+5), closed cell neoprene or closed cell silicone sponge.

The flexible securing ring 16 may be made in a variety of sizes having an outer diameter of about 1.0" for smaller plants to about 3.5" for larger plants. More specifically, the outer diameter of the flexible securing ring 16 may be about 1.0", about 1.3", about 1.5", about 1.8", about 2.0", about 2.3", about 2.5", about 2.8", about 3.0", about 3.3", or about 3.5". The thickness of the flexible securing ring 16 should be sufficiently large enough to secure the drawstring 24 when tightened about the flexible securing ring 16. In this regard, the thickness of the flexible securing ring 16 may range from about 0.5" for smaller plants to about 2.0" for larger plants. More specifically the thickness of the flexible securing ring 16 may be about 0.5", about 0.8", about 1.0", about 1.3" about 1.5" about 1.8" or about 2.0". The aperture of the flexible securing ring 16 is provided to receive the stem or trunk of a plant and its diameter will depend on the configuration provided along the inner edge of the aperture. For example, if the inner edge of the aperture is 90° to the top and bottom surfaces of the flexible securing ring 16 (i.e., a flat surface) then the diameter of the aperture may be in the range of 0.3" to about 2.0". More specifically the diameter of the aperture in this configuration may be about 0.3", about 0.5", about 0.8" about 1.0", about 1.3", about 1.5", about 1.8" or about 2.0". Alternatively, the inner edge of the aperture may be rounded, tapered or provide a outwardly extending skirt (e.g., a outwardly extending flange or skirt of about 3 mm to about 5 mm in thickness) to provide a snug fit about the stem or trunk of the plant and to allow for growth. Since these other configurations provide a more flexible inner edge the diameter of the aperture could be smaller. For example, a smaller stemmed plant that could receive a securing ring having a flat surface inner edge of about 0.5" could be substituted with a securing ring having an inner edge of about 0.3" in the alternative configurations.

The groove 20 is a preformed or cut indentation about the center and along the outer perimeter edge of the flexible securing ring 16 having a cross-sectional view that is square-shaped or circular-shaped without overlapping top and bottom edges (i.e., a sideways "U"-shaped cross-sectional view) or with overlapping top and bottom edges (i.e., a "C"-shaped cross-sectional view). The "C"-shaped groove 20 is distinguished from the sideways "U"-shaped groove 20 by having minor overlapping top and bottom edges that fit snugly to the draw string cord 24 of the sack 12. The depth of the groove 20 may be from about ⅛" to about ½". More specifically, the depth of the groove 20 may be about ⅛", about ¼" about ⅜" or about ½". One skilled in the art can easily test and determine which groove 20 depth would be best given the size of the flexible securing ring 16 selected and the diameter of the drawstring 24 when in the narrow tubular aperture 14 of the top of the fabric sack 12 to assure a tight, snug fit with minimal or no gaps that would allow pest to enter or exit the flexible container of the present invention 10.

The opening is a cut through the donut-shaped flexible securing ring 16 and extends from the outer edge of the flexible securing ring disk to the inner edge of the aperture. The cut 22 may be straight, either parallel or tangential, to the diameter of the aperture or it may be a curved cut such as that shown in FIG. 1. The tangential cut 22 may be straight or curved and would have the benefit of reducing any gaps forming when the aperture of the flexible securing ring 16 is too small (i.e., gaps forming at the cut opening because the stalk or trunk diameter is larger than the aperture diameter) or too large (i.e., gaps forming between the interior perimeter edge of the aperture and the stalk because the aperture is larger than the stalk or trunk). More specifically, the sides of the tangential cut 22 are able to slide against each other, forming a tighter seal when crimped together by the fabric sack's drawstring 24. The angle of the tangential cut 22 may range from about 30 degrees to about 90 degrees to the diameter of the aperture. More specifically, it may be about 30 degrees, about 45 degrees, about 60 degrees or about 90 degrees.

A variety of adhesives may be utilized with the present invention that do not adversely affect the plant, that resists entering or exiting of pests from the fabric sack 12, is flexible and maintains integrity during use. For example, Tanglefoot (The Scotts Company, LLC Columbus, Ohio, U.S.) is a sticky adhesive composition that is applied to the base of many plants in agriculture to stop insects from travelling up the stalks. Consequently, Tanglefoot may be applied to the inside of the flexible securing ring 16 prior to use or applied after the flexible securing ring 16 is affixed to the stalk or trunk of the plant. If the flexible securing ring 16 is provided with the adhesive along the edge of the aperture it may also have a protective removable cover (i.e., the cover may be easily peeled off of the adhesive prior to receiving the stalk or trunk of the plant) to prevent damage before use. Other similar adhesives known to those skilled in the art, such as plant waxes, may be utilized in the same fashion.

Draw String

The drawsting 24 may be made of any natural (e.g., manila hemp, hemp, linen, cotton, coir, jute, straw and sisal) or synthetic material (e.g., polypropylene, nylon, polyesters (i.e., polyethylene terephthalate, liquid crystalline polymers, Vectran), polyethylene (e.g., Dyneema and Spectra), Aramids (i.e., Twaron Technora and Kevlar) and acrylics (e.g., Dralon) that is durable and able to withstand breaking under several pounds of pressure when stretched. One skilled in the art would be able to select the appropriate cord strength based on the desired use. For example, smaller root balls are less heavy than larger root balls consequently, a smaller root ball (i.e., one-quarter gallon size) may likely use a cord with a minimum break strength of about 10 pounds while larger root balls of heavier weight (i.e., a seven gallon size) may require a minimum breaking strength of about 550 pounds or more. In this regard and knowing that the fabric sack 12 has a narrow tubular aperture 14, a material having a significant breaking strength but with a narrower diameter may be selected. For example, parachute cord or paracord may provide the desired characteristics. In at least one embodiment of the present invention, the drawstring 24 when fitted through the narrow tubular aperture 14 of the fabric sack 12 should be of a combined diameter that will snuggly fit within the groove 20 of the flexible securing ring 16. Consequently, an appropriate sized securing ring 16 with a groove 20 opening able to accept this desired diameter may be selected.

Paracord for strings for small bags 3.5" to 1 gallon sizes may be for example, MSO3 1.18 mm Micro Cord Paracord (polyester & nylon) (Atwood Rope MFG, Winchester, Ohio), 1.18 mm Micro Cord Paracord (polyester & nylon) (Paracord Planet, Fargo, N. Dak.) or 1.18 mm Micro Cord Paracord (polyester & nylon) (Westcoast Paracord, El Wood Braiding, Marathon, N.Y.). Paracord for strings in larger bags, 3 gallons, 5 gallons and 7 gallons, may be for example, 550 Paracord (polyester & nylon), (Atwood Rope MFG, Winchester, Ohio), 550 Paracord (polyester & nylon) (Paracord Planet, Fargo, N. Dak.) or 550 Paracord (polyester & nylon) (Westcoast Paracord, El Wood Braiding, Marathon, N.Y.).

The drawstring 24 may further comprise a securing clip or lock 26 that holds the drawstring 24 tight during use. For example, a plastic toggle spring stop single hole string cord lock or similar device may be used to secure the drawstring 24 when tightened about the flexible securing ring 16. A variety of these clips may be purchased commercially.

Spring clips, cord lock suppliers include for example, Ravenox, Burlington, N.C., USA, Yiwu Jiarui Garment Accessories, Co., Ltd, Zhejiang, China, Wenzhou Merit Garment, Co., Ltd, Zhejiang, China, Yiwu Glianfeng Electronic Commerce, Co., Ltd, Zhejiang, China, Uxcell, Hong Kong, China. Alternatively, the drawstring may merely be tied in a knot.

Make and Use

The flexible container of the present invention may be prepared for any size root ball, including for example a one-quarter gallon size, one-half gallon size, one gallon size, five gallon size, seven gallon size and ten gallon size. The size of the flexible container selected will depend on the size of the plant's root ball. Once the appropriate size is selected, an appropriately sized securing ring is selected. For example, if the stalk of the plant is one-quarter inch, then a securing ring of about 1.5 inches having an interior aperture diameter of about one-quarter inch may be selected. Alternatively, a large diameter securing ring with a larger aperture diameter may also be used to allow for an increasing diameter of the stalk or trunk during growth of the plant, if desired. The interior aperture of the securing ring may have adhesive provided on its interior perimeter edge. This may have a protective cover that prevents the adhesive from being damaged prior to use. This protective cover is removed before the plant stalk is inserted through the opening in the ring and affixed to the adhesive. Alternatively, a quantity of adhesive may be provided to allow the user to apply the volume of adhesive desired to close all gaps between the stalk and the inner perimeter edge of the securing ring. Once the securing ring is in place, the root ball of the plant may be inserted into the fabric sack. Assuring that the securing ring is positioned an appropriate height above the root ball, the draw string is then drawn taught closing the top of the fabric sack and snugly securing the draw string within the groove of the securing ring. The draw string may be tightened and secured by a securing device or cinch lock provided on the draw string. Alternatively, the draw string may be merely tied into a knot. The tightening of the draw string about the securing ring helps to tighten the ring about the stalk and also closes the remaining gaps that may be present between the groove and the drawstring within the narrow tubular aperture. When the opening in the securing ring is a tangential cut, it allows the sides of the opening to slide over each other thereby reducing the diameter of the interior aperture of the securing ring and tightening the ring to the stalk or trunk of the plant. Since the mesh of the fabric sack is selected to prevent pest from entering or leaving, the life cycle of these pests is interrupted by interfering with their need to migrate from the soil to the plant or from the plant to the soil required to complete their life cycle, which significantly reduces the ability of the pests to damage the plant.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

I claim:

1. A flexible container to house a root ball of a plant comprising:
    a fabric sack having a mesh that inhibits or interferes with a life cycle of a pest that infects or attempts to infest said root ball of said plant, wherein said sack having an enclosed base, a height, a circumference and an open top and wherein said open top is folded over forming a narrow tubular aperture;
    a flexible securing ring having an outer diameter and a central aperture able to receive a stalk of said plant, an outer perimeter edge having a groove, an inner edge and an opening from said outer perimeter edge to said inner edge, said flexible securing ring outer diameter is about 1.0 inch to about 3.5 inches and said flexible securing ring has a thickness of about 0.5 inches to about 2.0 inches, said groove having a depth of about ⅛ inch to about ½ inch, said central aperture having a diameter of about 0.3 inches to about 2.0 inches, said opening is a cut tangential to said central aperture, and said cut is straight or curved to allow sides of said cut to slide against each other; and
    a draw string fitted through said narrow tubular aperture of said open top of said sack, wherein said draw string fitted through said narrow tubular aperture is able to fit into said groove of said outer perimeter edge of said flexible securing ring when said draw string is drawn.

2. The flexible container according to claim 1, wherein said mesh is in the range of about 70 μm to about 110 μm.

3. The flexible container according to claim 1, wherein said mesh is about 70 μm, about 75 μm, about 80 μm, about 85 μm, about 90 μm, or about 100 μm.

4. The flexible container according to claim 1, wherein said pests are Thrips, Root Aphids, Fungus Gnats, Cucumber Beetles or Russet Mites.

5. The flexible container according to claim 1, wherein said enclosed base of said fabric sack is about 8 cm in length and about 8 cm in width, the circumference of about 32 cm and a height of about 16 cm.

6. The flexible container according to claim 1, wherein said enclosed base of said fabric sack is about 14 cm in length and about 14 cm in width, the circumference of about 56 cm and a height of about 36 cm.

7. The flexible container according to claim 1, wherein said enclosed base of said fabric sack is about 28 cm in length and about 28 cm in width, the circumference of about 110 cm and a height of about 48 cm.

8. The flexible container according to claim 1, further comprising an adhesive along said inner edge of said securing ring.

9. The flexible container according to claim 1, further comprising a securing lock on said draw string to secure said draw string when drawn.

10. A method of reducing, interfering or inhibiting a life cycle of a pest that infests or attempts to infest a root ball of a plant comprising the steps of:
    applying a flexible container to said root ball of said plant, wherein said flexible container comprises a fabric sack having a mesh that inhibits or interferes with the life cycle of a pest that infests said root ball of said plant, wherein said sack having an enclosed base, a height, a circumference and an open top and wherein said open top is folded over forming a narrow tubular aperture; a flexible securing ring having an outer diameter and a central aperture able to receive a stalk of said plant, an outer perimeter edge having a groove, an inner edge and an opening from said outer perimeter edge to said inner edge, said flexible securing ring outer diameter is about 1.0 inch to about 3.5 inches and said flexible securing ring has a thickness of about 0.5 inches to about 2.0 inches, said groove having a depth of about ⅛ inch to about ½ inch, said central aperture having a diameter of about 0.3 inches to about 2.0 inches, said opening is a cut tangential to said central aperture, and said cut is straight or curved to allow sides of said cut to slide against each other; and a draw string fitted through said narrow tubular aperture of said open top of said sack, wherein said draw string fitted through said narrow tubular aperture is able to fit into said groove of said outer perimeter edge of said flexible securing ring when said draw string is drawn; and maintaining said sack on said root ball of said plant for at least one life cycle of said pest.

11. The method of claim 10, wherein said mesh of said flexible container is in the range of about 70 µm to about 110 µm.

12. The method of claim 10, wherein said mesh of said flexible container is about 70 µm, 75 µm, 80 µm, about 85 µm, about 90 µm, about 95 µm, or about 100 µm.

13. The method of claim 10, wherein said pests are Thrips, Root Aphids, Fungus Gnats, Cucumber Beetles or Russet Mites.

14. The method of claim 10, wherein said enclosed base of said fabric sack is about 8 cm in length and about 8 cm in width, the circumference of about 32 cm and a height of about 16 cm.

15. The method of claim 10, wherein said enclosed base of said fabric sack is about 14 cm in length and about 14 cm in width, the circumference of about 56 cm and a height of about 36 cm.

16. The method of claim 10, wherein, said enclosed base of said fabric sack is about 28 cm in length and about 28 cm in width, the circumference of about 110 cm and a height of about 48 cm.

17. The method of claim 10, further comprising an adhesive along said inner edge of said securing ring.

18. The method of claim 10, further comprising a securing lock on said draw string to secure said draw string when drawn.

* * * * *